United States Patent [19]

Aust et al.

[11] Patent Number: 4,889,875

[45] Date of Patent: Dec. 26, 1989

[54] PHENOLIC RESIN FOAMS OF HIGH FILLER CONTENT AND THEIR USE AS INSULATION

[75] Inventors: Aloys Aust, Niederkrüchten; Josef Tiroux, Troisdorf; Franz Weissenfels, Siegburg, all of Fed. Rep. of Germany

[73] Assignees: Dynamit Nobel AG, Cologne; Isobloc GmbH, Niederkrüechten, both of Fed. Rep. of Germany

[21] Appl. No.: 137,415

[22] Filed: Dec. 23, 1987

[30] Foreign Application Priority Data

Dec. 24, 1986 [DE] Fed. Rep. of Germany ....... 3644468

[51] Int. Cl.$^4$ ............................................... C08J 9/14
[52] U.S. Cl. .................................... 521/123; 521/91; 521/92; 521/122; 521/181; 521/907
[58] Field of Search ............... 521/181, 907, 122, 123, 521/92, 91

[56] References Cited

U.S. PATENT DOCUMENTS 2,933,461 4/1960 Mullen ............................... 521/181
4,419,460 12/1983 Ho ....................................... 521/181
4,461,852 7/1984 Nakamura et al. ................... 52/181

Primary Examiner—Morton Foelak
Attorney, Agent, or Firm—Felfe & Lynch

[57] ABSTRACT

The present invention relates to hard foams having foamed and hardened phenolic resins as binding agents, and in which over 90% of the filler is aluminum hudroxide. The filler content is more than 100% with respect to the resin content of the foams. The foamble, filler-containing composition used for the production of the foams is very fluid and can be used directly for the production of moldings of any desired geometry. The aluminum hydroxide used has a grain size distribution such that between 30 to 60% of the filler is in the grain size range under 5 microns. The moldings containing the hard foam can also be in the form of composites. They are characterized not only by their good insulating properties but also by improved compressive strength, extremely little shirinkage tendency and extraordinarily high fire resistance. They are used mainly in the construction industry.

2 Claims, No Drawings

PHENOLIC RESIN FOAMS OF HIGH FILLER CONTENT AND THEIR USE AS INSULATION

BACKGROUND OF THE INVENTION

The subject matter of the present invention is phenolic resin foams of high filler content, and their use as insulation.

It is known to admix fillers with certain phenolic resol resins so that, when these mixtures are foamed, rigid foams with a high content of fillers are obtained. It is furthermore known that these foams can be of Fire Class A2 and are suitable for use in the building industry for the production of foam insulation materials.

The production of these known hard foams, however, runs into difficulties because the liquid phenolic resol resin which they require is very difficult to foam even at a filler content amounting to 250% of the weight of the liquid phenolic resol resin, and repeatable results cannot be achieved.

It is furthermore disadvantageous in these known rigid foams that they do not have sufficient compressive strength, so that their use in the building industry is problematical. Furthermore, these foams have a shrinkage of about 1% which negatively affects their use in insulation.

The problem therefore was to find some thermosetting rigid foams having a filler content in excess of 100% of the weight of the resin content of the foam, which would still be fluid in the form of foamable mixtures so that they can be foamed easily. Furthermore, the desired foams were to have densities between 200 and 500 kg/cu m, have very little shrinkage, and have a greater compressive strength than known thermosetting rigid foams.

SUMMARY OF THE INVENTION

As a solution to this problem, rigid foams have now been found having a filler content of more than 100% of the weight of the resin content of the foam, which are prepared by foaming a fluid mixture of phenolic resol resins, blowing agents, hardeners and fillers, which are characterized by the distinctive features of claim 1.

The rigid foams according to the invention have densities of 200 to 500 kg/cu m, preferably of 250 to 350 kg/cu m. They can be prepared by the foaming, known in itself, of phenolic resol resins which contain, in addition to the known hardeners and blowing agents for the foaming and hardening, fillers in amounts exceeding 100% of the weight of the phenolic resol resin before foaming. These phenolic resol resins are still fluid in spite of their high content of fillers.

The rigid foams according to the invention have physical properties at least equal to those of known rigid foams with the same or a greater content of fillers. The rigid foams according to the invention have a higher compressive strength and less shrinkage at a lower solids content than the known rigid foams according to DE-PS No. 32 44 779 (=U.S. Pat. Nos. 4,521,543 and 4,532,261), and they nevertheless satisfy conditions for fire class A2 according to DIN 4102; when burned they produce virtually no smoke. Based on their high filler content their mechanical properties, such as compressive strength, exceed those of the known thermosetting rigid foams. Furthermore, their fire resistance is extraordinarily good and exceeds that of the known thermosetting rigid foams.

The thermosetting rigid foams according to the invention are furthermore characterized by good insulating properties. They can therefore be used preferentially as insulating materials. These materials can be, for example, in the form of blocks, boards, semicylindrical shells or pipe jacketing.

Such products are used chiefly in building construction. The rigid foams according to the invention can also be produced in geometrical shapes suitable for use as other insulation products which are used in the building and plumbing industries.

The insulating materials can also be in the form of laminated. Possible components of such laminates are wood, metal or plastic. In such composite materials the foam according to the invention shows no shrinkage at the interface between the foam and the material with which it is laminated It is even possible to make such laminates, as well as the molded products referred to above, with an outermost layer of a greater density than the core. The thickness and density of this layer can be controlled.

The products made of the laminated material are also products which are used in the building industry, such as jacketed pipes in which the foam is placed between the jacketing and the pipe, or they are products which are used in the sanitation industry, such as portable toilet booths, for example.

The insulation in the above-mentioned molded products acts against the transfer of heat, cold or sound.

The phenolic resol resins used for the production of the rigid foams according to the invention are known resins which are obtained by alkaline condensation of phenol and formaldehyde. The condensation is performed in a known manner such that foamable phenolic resol resins are formed. No furfurol or furfuryl alcohol or furan resins are added before or during the condensation. The resol resin is free from furan compounds.

The foaming is performed by means of blowing agents and hardeners. Suitable blowing agents are low-boiling hydrocarbons such as pentane, hexane or mixtures of these hydrocarbons, which boil in the range between 40° and 90° C. Also fluorinated hydrocarbons which boil in this temperature range can be used as blowing agents.

The content of the blowing agents in the mixture to be foamed is between 1 and 15% of the weight of the phenolic resol resin, preferably between 2 and 5% by weight.

Aromatic sulfonic acids, such as the toluenesulfonic acids, mixed with sulfuric acid if desired, are used as the hardeners. The amount of the hardener is between 10 and 15%, preferably between 10 and 15%, of the weight of the phenolic resol resin.

The aluminum hydroxide to be used must be very finely granular; at least the content of fines (grain sizes under 5.0 microns) must be between 30 and 60% of the total amount of filler.

The preferred filler is aluminum hydroxide in the form of hydrargillite. The aluminum hydroxide amounts to at least 90% of the filler content. The remainder can be other solids known to be used in hard foams. Also, the filler can consist entirely of aluminum hydroxide. Also, up to 10% of the aluminum hydroxide can be replaced by silica.

EXAMPLE 1 kg of phenolic resol resin (commercially available under the name DYNAPOR [R] T 612 S3 from Dynamit Nobel AG, Troisdorf) is mixed with 20 g of n-pentane, 1200 g of aluminum hydroxide of a fineness range from 2 to 150 microns having between 30 and 60% of the grain size less than five microns., and 150 g of a hardener consisting of a mixture of 40 weight-parts of toluenesulfonic acid, 20 weight-parts of 96% sulfuric acid, and 40 weight-parts of water. The mixture is then poured into a prepared wooden form with a free volume of 6000 cubic centimeters. At the end of 45 minutes the foaming and hardening reaction is finished. The article obtained completely fills the form and can be removed from the form at this time.

The article has a density of 350 kg/cu m. Its compressive strength is 21 kg/sq cm. The content of open cells amounts to 30% (measured with a Beckmann Air Comparison Pyknometer). Its thermal conductivity (24°) is 0.06 W/mK. After exposure for 2 days at 100° C. the loss of volume was about 0.3%. The article had a denser outer skin of about 5 mm thickness.

A slab 20 mm thick cut from the article showed a fire resistance of 80 minutes when exposed to the flame of a Bunsen burner and a surface temperature of about 1100° C.

We claim:

1. Thermosetting resin hard foam with a filler content over 100 wt.-% with respect to the resin content of the foam, prepared by foaming a fluid mixture of the corresponding resol resin, blowing agents, hardeners and fillers, characterized in that
    (a) a furan-free phenolic resol resin is used as the resol resin, which is hardened by toluenesulfonic acid to which sulfuric acid is also added,
    (b) at least 90% of the fillers is aluminum hydroxide, of which up to 10% can be replaced by silica,
    (c) the aluminum hydroxide has a content of the grain size range under 5 microns between 30 and 60%.

2. Hard foam according to claim 1, characterized in that the filler is hydrargillite.

* * * * *